United States Patent
Xue et al.

(10) Patent No.: US 10,760,890 B2
(45) Date of Patent: Sep. 1, 2020

(54) GAGE FOR MEASURING A DISTANCE FROM A HOLE CENTER TO A PLANE

(71) Applicant: CITIC Dicastal CO., LTD., Qinhuangdao, Hebei (CN)

(72) Inventors: Bowen Xue, Qinhuangdao (CN); He Chen, Qinhuangdao (CN); Bingjie Duan, Qinhuangdao (CN); Jiandong Guo, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 246 days.

(21) Appl. No.: 16/023,499

(22) Filed: Jun. 29, 2018

(65) Prior Publication Data
US 2019/0285395 A1    Sep. 19, 2019

(30) Foreign Application Priority Data
Mar. 19, 2018  (CN) .......................... 2018 1 0225966

(51) Int. Cl.
*G01B 5/14* (2006.01)
(52) U.S. Cl.
CPC ..................... *G01B 5/14* (2013.01)
(58) Field of Classification Search
CPC .......... G01B 5/14; G01B 5/201; G01B 5/285
USPC .......................................................... 33/832
See application file for complete search history.

(56) References Cited

U.S. PATENT DOCUMENTS

| 7,827,702 | B1 * | 11/2010 | Zhang | ...................... G01B 5/14 33/613 |
| 8,468,706 | B2 * | 6/2013 | Zhang | ..................... G01B 5/143 33/1 BB |
| 9,316,470 | B2 * | 4/2016 | Zhang | .................... G01B 3/002 |
| 9,523,565 | B2 * | 12/2016 | Zhang | ................... G01B 5/0004 |

(Continued)

FOREIGN PATENT DOCUMENTS

| CN | 201600105 U | 10/2010 |
| CN | 201637370 U | 11/2010 |

(Continued)

OTHER PUBLICATIONS

First Office Action of the Chinese application No. No. 201810225966.3, dated Jun. 3, 2019, 12 pgs.

(Continued)

*Primary Examiner* — Yaritza Guadalupe-McCall
(74) *Attorney, Agent, or Firm* — Cooper Legal Group, LLC

(57) ABSTRACT

A gage for measuring the distance from a hole center to a plane, consisting of a measurement plate, a fixed block, a fixed column, and a spring. When the gage is used, a positioning column is first inserted into a measured hole to preliminarily position the fixed column; the fixed column is further inserted downwards, so that the tapered surface of a tapered column is fitted with the orifice circumference of the measured hole, and the fixed column is completely positioned; whether a measured reference plane B is placed between the steps on the right side below the measurement plate is observed; and if the measured reference plane B is placed between the steps on the right side below the measurement plate, it indicates that the distance from the measured hole center to the measured reference plane B is qualified, otherwise, the distance is unqualified.

4 Claims, 4 Drawing Sheets

(56) References Cited

U.S. PATENT DOCUMENTS

| | | | | |
|---|---|---|---|---|
| 2009/0094851 A1* | 4/2009 | Xiao | .................. | G01B 3/22 |
| | | | | 33/832 |
| 2010/0293803 A1* | 11/2010 | Zhang | .................. | G01B 5/143 |
| | | | | 33/810 |
| 2012/0266477 A1 | 10/2012 | Zhang | | |
| 2016/0061577 A1* | 3/2016 | Zhang | .................. | G01B 5/0004 |
| | | | | 33/832 |

FOREIGN PATENT DOCUMENTS

| | | |
|---|---|---|
| CN | 201706994 U | 1/2011 |
| CN | 202216640 U | 5/2012 |
| CN | 203349756 U | 12/2013 |
| CN | 104457513 A | 3/2015 |
| CN | 204228078 U | 3/2015 |
| CN | 105277101 A | 1/2016 |
| CN | 205262349 U | 5/2016 |
| CN | 106705795 A | 5/2017 |
| CN | 106767315 A | 5/2017 |
| CN | 207850256 U | 9/2018 |

OTHER PUBLICATIONS

Supplementary European Search Report in the European application No. 19162850.2, dated Jun. 5, 2019, 7 pgs.

* cited by examiner

GAGE FOR MEASURING A DISTANCE FROM A HOLE CENTER TO A PLANE

CROSS-REFERENCE TO RELATED APPLICATIONS

The present application claims benefit of Chinese Patent Application No. 201810225966.3, filed on Mar. 19, 2018, the contents of which are hereby incorporated by reference in its entirety.

BACKGROUND

In the machining field of automotive parts, we often encounter some special detection requirements. Among them, a steering knuckle requires the detection of the distance from the center of a bolt hole of a lower swing arm to the plane of the lower swing arm. Each component in three-coordinate detection needs to be clamped, so the efficiency is very low. Therefore, a gage that is simple and convenient to use is needed for detection.

SUMMARY

The present disclosure relates to a gage, in particular to a gage for measuring a distance from a hole center to a plane.

The object of the present disclosure is to provide a gage that can detect the distance from a hole center to a plane.

In order to fulfill the above aim, the technical solution of the present disclosure is a gage for measuring a distance from a hole center to a plane consisting of a measurement plate, screws, a fixed block, a jack screw, a fixed column and a spring, in which the upper right part of the measurement plate is attached to the left side of the fixed block, and both are fixed by the screws; the guide column at the upper part of the fixed column is fitted with a hole in the fixed block, and the fit clearance is not more than 0.01 mm; the jack screw is installed on the right side of the fixed block, and the top thereof is fitted with a sliding chute in the guide column; and the spring is sleeved outside the guide column and arranged below the fixed block.

The fixed column includes a positioning column, a transition column, a tapered column and a guide column; the top of the positioning column is connected with the lower end of the transition column; the upper end of the transition column is connected with the bottom surface of the small end of the tapered column; and the top surface of the large end of the tapered column is connected with the lower end of the guide column.

The size of the positioning column is the lower deviation of the diameter of a workpiece positioning hole, that is, Φ (A-E), and the tolerance is (−0.01, 0) mm; the large end diameter of the tapered column is larger than the upper deviation of the diameter of the workpiece positioning hole, and the small end diameter is smaller than the lower deviation of the diameter of the workpiece positioning hole.

The right side below the measurement plate is a step surface, the step height is the tolerance of the distance from a measured hole center to a reference plane B, i.e., 2D mm, and the tolerance is (−0.01, 0) mm; the distance from the center line of the fixed column to the rightmost surface of the measurement plate is (C-D) mm, and the tolerance is (0, +0.01) mm.

In the working process, the positioning column is first inserted into a measured hole to preliminarily position the fixed column; the fixed column is further inserted downwards, the tapered surface of the tapered column is fitted with the orifice circumference of the measured hole, and the fixed column is completely positioned; whether the measured reference plane B is placed between the steps on the right side below the measurement plate is observed; and if the measured reference plane is placed between the steps on the right side below the measurement plate, it indicates that the distance from the measured hole center to the measured reference plane B is qualified, otherwise, the distance is unqualified.

The gage of the present disclosure can measure the distance from a hole center to a plane in use, and meanwhile, has the characteristics of simple structure, high detection precision, high safety and stability, low manufacturing cost and the like.

LIST OF REFERENCE SYMBOLS

Figure 1:
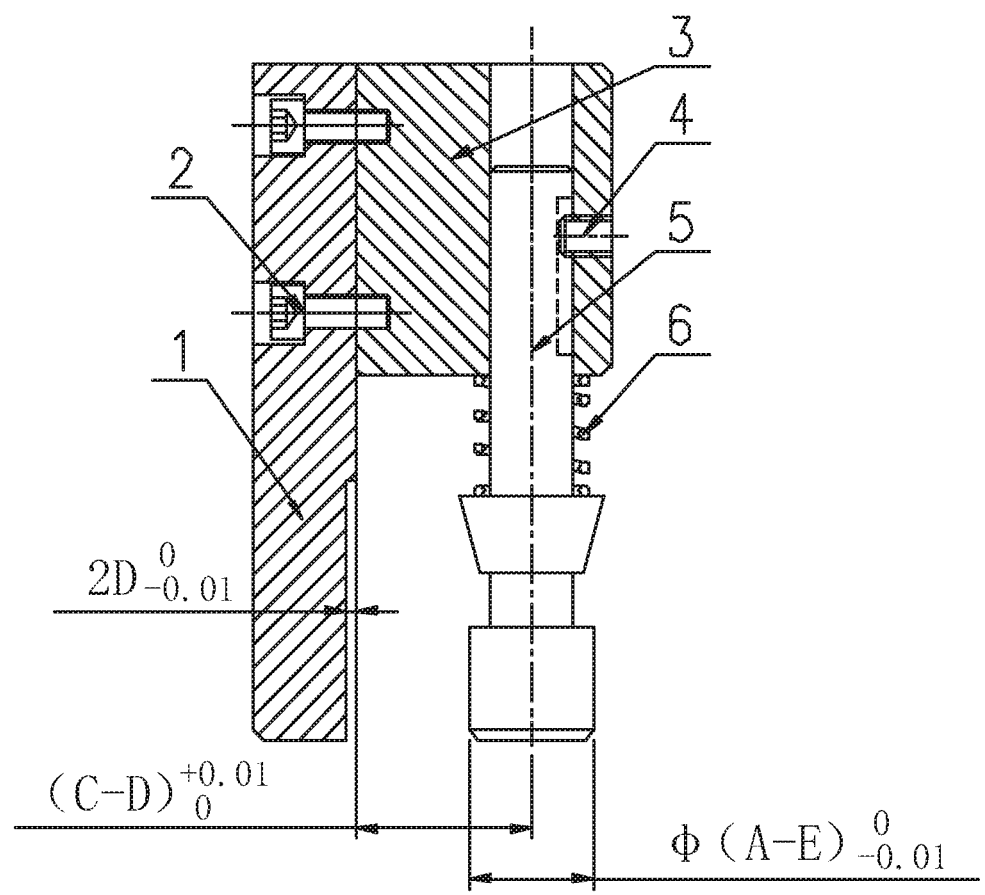
FIG. 1 is a front view of a gage for measuring the distance from a hole center to a plane according to the present disclosure.
Figure 2:
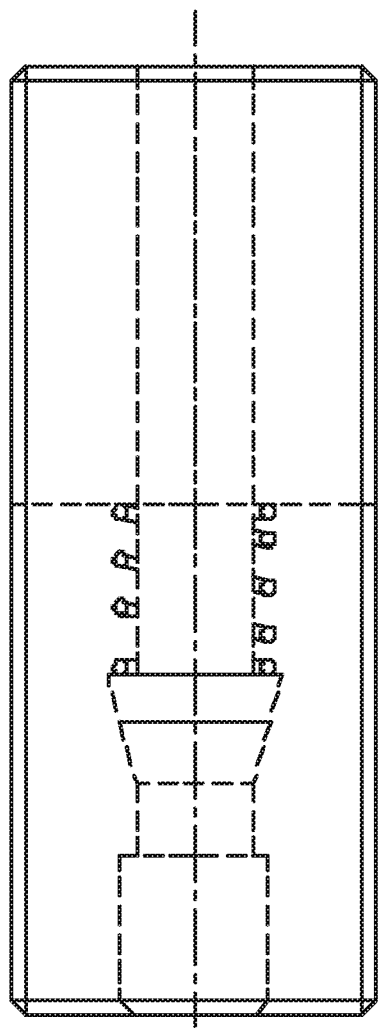
FIG. 2 is a left view of the gage for measuring the distance from a hole center to a plane according to the present disclosure.
Figure 3:
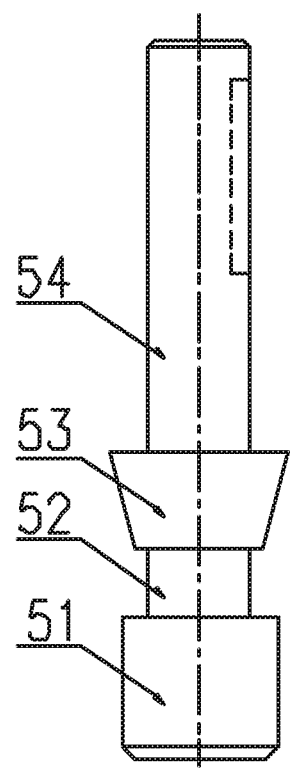
FIG. 3 is a front view of a fixed column of the gage for measuring the distance from a hole center to a plane according to the present disclosure.
Figure 4:
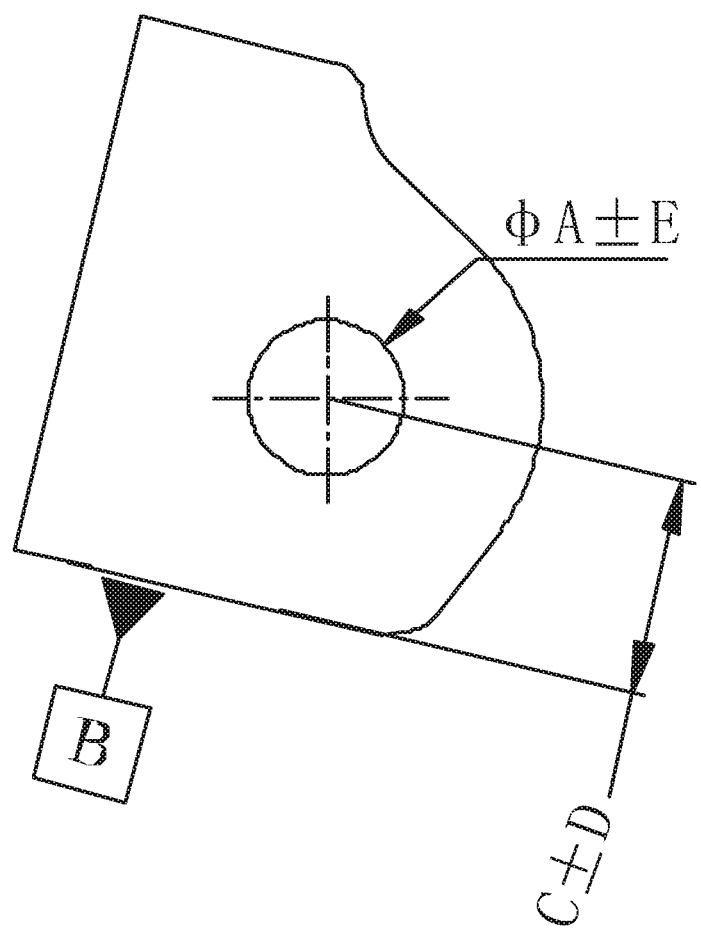
FIG. 4 is a front view of measured elements according to the present disclosure.

1 measurement plate
2 screw
3 fixed block
4 jack screw
5 fixed column
6 spring
51 positioning column
52 transition column
53 tapered column
54 guide column

DETAILED DESCRIPTION

The details and working conditions of the specific device according to the present disclosure will be described below in combination with the drawings.

The device consists of a measurement plate 1, screws 2, a fixed block 3, a jack screw 4, a fixed column 5 and a spring 6, in which the upper right part of the measurement plate 1 is attached to the left side of the fixed block 3, and both are fixed by the screws 2; the guide column 54 at the upper part of the fixed column 5 is fitted with a hole in the fixed block 3, and the fit clearance is not more than 0.01 mm; the jack screw 4 is installed on the right side of the fixed block 3, and the top thereof is fitted with a sliding chute in the guide column 54; and the spring 6 is sleeved outside the guide column 54 and arranged below the fixed block 3.

The fixed column 5 includes a positioning column 51, a transition column 52, a tapered column 53 and a guide column 54; the top of the positioning column 51 is connected with the lower end of the transition column 52; the upper end of the transition column 52 is connected with the bottom surface of the small end of the tapered column 53; and the top surface of the large end of the tapered column 53 is connected with the lower end of the guide column 54.

The size of the positioning column 51 is the lower deviation of the diameter of a workpiece positioning hole, that is, Φ (A-E), and the tolerance is (−0.01, 0) mm; the large end diameter of the tapered column 53 is larger than the upper deviation of the diameter of the workpiece positioning hole, and the small end diameter is smaller than the lower deviation of the diameter of the workpiece positioning hole.

The right side below the measurement plate 1 is a step surface, the step height is the tolerance of the distance from a measured hole center to a reference plane B, i.e., 2D mm, and the tolerance is (−0.01, 0) mm; the distance from the center line of the fixed column 5 to the rightmost surface of the measurement plate 1 is (C-D) mm, and the tolerance is (0, +0.01) mm.

In the working process, the positioning column 51 is first inserted into a measured hole to preliminarily position the fixed column 5; the fixed column 5 is further inserted downwards, the tapered surface of the tapered column 53 is fitted with the orifice circumference of the measured hole, and the fixed column 5 is completely positioned; whether the measured reference plane B is placed between the steps on the right side below the measurement plate 1 is observed; and if the measured reference plane B is placed between the steps on the right side below the measurement plate 1, it indicates that the distance from the measured hole center to the measured reference plane B is qualified, otherwise, the distance is unqualified.

The invention claimed is:

1. A gage for measuring a distance from a hole center to a plane, consisting of a measurement plate, screws, a fixed block, a jack screw, a fixed column and a spring, wherein an upper right part of the measurement plate is attached to a left side of the fixed block, and both are fixed by the screws; a guide column at an upper part of the fixed column is fitted with a hole in the fixed block, and a fit clearance is not more than 0.01 mm; the jack screw is installed on a right side of the fixed block, and a top thereof is fitted with a sliding chute in the guide column; and the spring is sleeved outside the guide column and arranged below the fixed block.

2. The gage for measuring a distance from a hole center to a plane according to claim 1, wherein the fixed column comprises a positioning column, a transition column, a tapered column and a guide column; a top of the positioning column is connected with a lower end of the transition column; an upper end of the transition column is connected with a bottom surface of a small end of the tapered column; and a top surface of a large end of the tapered column is connected with a lower end of the guide column.

3. The gage for measuring a distance from a hole center to a plane according to claim 1, wherein the size of the positioning column is a lower deviation of the diameter of a workpiece positioning hole, that is, Φ (A-E), and the tolerance is (−0.01, 0) mm; the large end diameter of the tapered column is larger than an upper deviation of the diameter of the workpiece positioning hole, and the small end diameter is smaller than the lower deviation of the diameter of the workpiece positioning hole.

4. The gage for measuring a distance from a hole center to a plane according to claim 1, wherein a right side below the measurement plate is a step surface, a step height is the tolerance of the distance from a measured hole center to a reference plane B, i.e., 2D mm, and the tolerance is (−0.01, 0) mm; the distance from the center line of the fixed column to a rightmost surface of the measurement plate is (C-D) mm, and the tolerance is (0, +0.01) mm.

* * * * *